US012383873B2

(12) United States Patent
Jensen

(10) Patent No.: US 12,383,873 B2
(45) Date of Patent: Aug. 12, 2025

(54) GEOPOLYMER FOAM DEPOSITION AND MIXING SYSTEM AND APPARATUS

(71) Applicant: Rosenblatt Innovations LLC, Petaluma, CA (US)

(72) Inventor: David I. Jensen, Petaluma, CA (US)

(73) Assignee: ROSENBLATT INNOVATIONS LLC, Petaluma, CA (US)

( * ) Notice: Subject to any disclaimer, the term of this patent is extended or adjusted under 35 U.S.C. 154(b) by 0 days.

(21) Appl. No.: 18/662,732

(22) Filed: May 13, 2024

(65) Prior Publication Data

US 2024/0293785 A1 Sep. 5, 2024

Related U.S. Application Data

(63) Continuation-in-part of application No. 17/309,163, filed as application No. PCT/US2019/059119 on Oct. 31, 2019, now Pat. No. 11,981,049.

(60) Provisional application No. 62/753,788, filed on Oct. 31, 2018.

(51) Int. Cl.

| | |
|---|---|
| ***B28B 1/50*** | (2006.01) |
| ***B01F 23/20*** | (2022.01) |
| ***B01F 27/806*** | (2022.01) |
| ***B01F 33/84*** | (2022.01) |
| ***B01F 35/75*** | (2022.01) |
| *B01F 101/00* | (2022.01) |

(52) U.S. Cl.

CPC .......... *B01F 23/291* (2022.01); *B01F 27/806* (2022.01); *B01F 33/84* (2022.01); *B01F 35/7547* (2022.01); *B28B 1/503* (2013.01); *B01F 2101/2805* (2022.01)

(58) Field of Classification Search

CPC ...... B28B 1/503; B28B 13/023; B28C 5/1207
See application file for complete search history.

(56) References Cited

U.S. PATENT DOCUMENTS

| | | | |
|---|---|---|---|
| 4,269,577 | A | 5/1981 | Borcoman |
| 2017/0203469 | A1 | 7/2017 | Cartier |
| 2017/0218642 | A1 | 8/2017 | Jensen |
| 2017/0348886 | A1 | 12/2017 | Fux et al. |

FOREIGN PATENT DOCUMENTS

| | | |
|---|---|---|
| WO | WO/2018/189151 | 10/2018 |

OTHER PUBLICATIONS

PCT/US19/59119, International Search Report dated Jan. 23, 2020, 2 pages—English.

PCT/US19/59119, Written Opinion dated Dec. 27, 2019, 6 pages—English.

Saldaev, VA, et al. Equipment for the Production of Wood-Polymeric Thermal Insulation Materials. 10P Conf. Ser.: Mater. Sol. Eng. 2016, vol. 142; DOI: 10.108811757-899X/142/1/012097; p. 1, Abstract; p. 1, Section 1. Introduction, First Paragraph to Third Paragraph; p. 2, Section 2, First Paragraph; p. 3, Figure 2; p. 3, Figure 2—caption; p. 4, First Paragraph.

*Primary Examiner* — James Sanders

(74) *Attorney, Agent, or Firm* — Andrew F. Young, Esq; NOLTE LACKENBACH SIEGEL

(57) ABSTRACT

The present invention relates to a system for the production of thermal insulating, architectural and structural foam materials cast in molded volumes configured for a subsequent milling process, wherein molded foam volumes are cut into dimensional products or product components.

13 Claims, 11 Drawing Sheets

GEOPOLYMER FOAM DEPOSITION AND MIXING SYSTEM AND APPARATUS

CROSS REFERENCE TO RELATED APPLICATIONS

This application relates to and claims priority as a continuation-in-part (CIP) from U.S. Ser. No. 17/309,163 filed Apr. 30, 2021 (allowed), the entire contents of which are incorporated herein fully by reference, which in turn is a § 371 National Stage of PCT/US2019/59119 filed Oct. 31, 2019 that claims priority from U.S. Prov. Ser. No. 62/753,788 filed Oct. 31, 2018.

FIGURE SELECTED FOR PUBLICATION

FIG. 8A.

BACKGROUND OF THE INVENTION

Field of the Invention

The present invention relates to material mixing and deposition systems for wet cast cementitious materials. More particularly the invention relates to a method and apparatus that minimizes material handling for batching, mixing, and depositing time-sensitive cementitious wet cast formulas into production molding. More specifically, the present invention relates to a production system for mixing and casting aerated autoclaved concrete ("AAC") and geopolymer foam. Finally, and even more particularly, the invention relates to a system for the production of thermal insulating, architectural and structural foam materials cast in molded volumes configured for a subsequent milling process, wherein molded foam volumes are cut into dimensional products or product components.

Background Art

Worldwide energy consumption is projected to grow as much as 40% in the next 20 years, due not only to sheer human population growth, but growth in populations using electric power. The dilemma in electricity production is in the trade-off between improvements in the material well-being of individuals that accompany the use of electricity and the adverse environmental impacts from fossil fuel consumption.

Thermal management of conditioned space buildings in developing economies is a notable component in overall energy consumption. Therefore, the thermal efficiencies of conditioned space buildings are high on the list of potential energy savings technologies. The use of thermally insulating materials constitutes the most effective way to increase the efficiencies of these conditioned space buildings. These materials consist substantially of variably refined polystyrene and polyurethane foams and glass fibers. To a lesser degree they consist of soy-based foams, cellulose, vermiculite, asbestos fiber, and cork. These materials have become very important to global building industries and represented a 21 billion dollar market share in 2014 in Europe alone.

The problem with currently used thermal insulating materials, and an important current issue in future energy demands, is that their manufacture and use is associated with negative environmental impacts (cork and vermiculite excepted). For example, the refinement of polystyrene foam involves the production of benzene and chlorofluorocarbons, and the resulting commercial products contain antioxidants and ignition retardant additives. The refinement of polyurethane involves the production methyl isocyanates gas (MIC) a dangerous compound widely known for its tragic association with the tragic 1984 Union Carbide disaster in Bhopal, India.

Additionally polystyrene and fiberglass both require high temperature processing. Troublingly, polystyrene and polyurethane release lethally toxic and explosive fumes when burned. Understandably, these flammable foams have been outlawed for use in conditioned space buildings in many jurisdictions throughout the U.S., Europe and Japan.

There is a growing interest and demand for sustainable building systems and net-carbon-zero construction to reduce future energy demands to sustainable levels. To provide new sustainable building systems, building and manufacturing industries must provide thermal insulating materials produced from clean sustainable technologies.

Air entrained Portland cement mortars and concretes are well known in the art, but the potential for weight-to-volume reduction is extremely limited in air entrained masonries. Therefore, they are very limited in their application as thermal insulating materials. AAC systems have more potential for lower weight-to-volume ratios and offering thermal insulation and structural values suitable for building materials, but AAC systems rely substantially on the binding properties of Portland cement. In addition to the high energy demands and carbon emissions of Portland cement production, AAC mortars and concretes require the additional energy demands and carbon emissions of autoclave temperatures and pressures for curing.

More recently, the development of geopolymer foam, or foamed geopolymers, constitutes a promising research field with high potential for the development of sustainable and non-toxic thermal insulation materials. Similar to AAC systems, geopolymer foam systems utilize various foaming agents that expand the volume of the geopolymer composition to an aerated porosity capable of lower weight-to-volume ratios. The foaming agents consist of two different classes: (1) gas producers; and (2) foam modifiers. The gas producers include (but are not limited to) metallic aluminum powder, zinc powder, sodium percarbonate, sodium perborate and hydrogen peroxide. The foam modifiers include various detergents containing surfactants. The most effective foaming agents are the gas-producing agents.

Metallic aluminum and zinc powders produce hydrogen gas when mixed into highly alkaline geopolymer and AAC systems. Sodium percarbonate, sodium perborate, and hydrogen peroxide all produce oxygen. The foam-modifying detergent surfactants have both hydrophilic and hydrophobic components that reduce the surface tension of water to form bubbles. Surfactant foaming agents are used in three ways. One is premix foaming wherein the surfactant is added to water and mixed aggressively to form a premix foam, and it is then mixed into a cementitious or geopolymer paste. A second approach, postmix foaming, involves adding the surfactant directly to a wet cementitious mix and then mixing aggressively to form foam in the cementitious or geopolymer paste. A third approach is to use the surfactant in conjunction with one of the gas-producing foaming agents to intensify and manage the cell size and structure of the foam generation.

Little to no heat generation is required and no toxic fumes are emitted in the production of geopolymer foam or in the production of its components. Furthermore, geopolymer foam is extremely fire resistant and does not off-gas when subjected to heat or flame. This makes geopolymer foam well-suited as a replacement for petrochemical foams for use as thermal insulating materials in many conditioned space building applications.

Currently, the most significant deficiency in geopolymer foam development and its applications is due to the complexity of the system and the time-sensitive nature of foam generation. Geopolymer foam systems usually require at least a three-part mix consisting of aluminum silicate clays, alkaline activators, and foaming agents. Once the alkaline activator of the geopolymer is added to the aluminum silicate clays, typical geopolymer systems start to gel and quickly harden in 10 to 30 minutes, depending on raw material options and ratios. Many formulations, depending on water content, will stiffen in five minutes or less, even when agitated. They will stiffen even faster if not agitated. Once a gas-producing foaming agent is added to the geopolymer system, depending on the amount of reactive material and the level of refinement, the production of gas and the expansion of the foam usually starts in only one to five minutes.

The most effective foaming agents for large volume expansion are gas-producing agents. These agents react with the alkalinity of the geopolymer and AAC paste. The higher the alkalinity of the cementitious paste, and the higher the required ratio of foaming agent, the more gas is produced, and therefore the more foam generated and expansion realized.

To expand a geopolymer foam system to the levels of aeration necessary to produce a material with a meaningful thermal insulation value, higher ratios of the most reactive foaming agents must be employed, making the production of foam expansion almost immediate. Furthermore, the reactive ingredients in such geopolymer foam systems create an exothermic reaction dramatically intensified in larger volume batches, accelerating the foam generation and early-stiffening of the batch. This limits the available options for material delivery and deposition in the larger volumes typically employed in industrial production.

Concrete mixers typically consist of cylindrical and bulbous drum containers with internal mixing blades or paddles fixed on and extending inwardly from the interior sides of the drum. The drum-thus the blades-rotates at variable rotation speeds ranging between 20 and 40 rpms. The rotation typically takes place around a tilted axis at variable degrees of tilt, from a substantially horizontal axis of rotation up to 45 degrees of tilt, at most. These are referred to as tumble mixers.

Planetary mixers are also employed for mixing concrete and mortars. Generally, they consist of cylindrical drums having a flat bottom floor with cylindrical walls extending vertically and open tops, often with lid enclosures. Planetary mixers have a plurality of internal mixing blades turning on at least one vertical axis. These are independent from a fixed drum in addition to the multiple or planetary axis of rotation. The fixed mixing drum configuration also commonly employs a mixer blade apparatus with a single axis of rotation.

Mixers employed for mixing mortars consist generally of horizontally disposed cylindrical mixing drums in which a portion of the cylinder drum is employed as a functional enclosure to an open top. These mortar mixers have a plurality of internal mixing blades rotating independently from the mixing drum, about a horizontal axis and employ a variable of single and multiple axis rotations.

Mixer adaptations for AAC production often include internal mixing blades rotating about a vertical axis inside a substantially enclosed, fixed cylindrical drum with a bottom floor extending down in a conical or half spherical shape. The mixed material is expelled through a port approximating the bottom of the mixing cavity. Mixed material is usually expelled into a separate material handing device or container. The port may also be connected to an enclose auger type conveyor that facilitates transport to another material handling apparatus and/or mold that facilitates transport to the autoclave.

In general material deposition from concrete and mortar mixers, whether the mixers comprise a fixed drum with rotating blades or a rotating drum with fixed blades, is facilitated by the movement of the internal mixing apparatus expelling the mixed material from the bottom or sides of the mixing cavity.

GFRC mixers generally consist of a blade- or paddle-type mixing apparatus at the bottom end of a vertically extended shaft lowered into a cylindrically shaped mixing drum where the batched material is mixed. After mixing is completed, the mixing apparatus is removed from the mixing drum, and the mixing drum is removed from its fixed position below the mixing apparatus and moved to the location of a mold or pump hopper. The mixing drum is then turned upside down to allow the deposition of the GFRC mix into a mold, pump, or chop gun hopper.

The most significant deficiency in extant mixers and related production systems disclosed herein for the production of time-sensitive wet cast systems is that the mixing, deposition, and transport of mix to the mold in all of these systems require separate, independent and therefore multiple apparatus for material handling. In many cases the production sequence simply takes too much time for a fast curing or quickly expanding gas producing system.

Aspects, Objects, and Disclosure of Invention

It is a principal object of the present invention to extend and expand the potential applications of time-sensitive wet cast systems and geopolymer foam systems. This is achieved by providing methods and supporting apparatus to effectively reduce the material handling time typically involved in the mixing, placement, and molding of geopolymer foam and other time-sensitive wet cast systems. The inventive method and apparatus combines mixing and inoculation of the mix, with the deposition of the inoculated mix into a production mold in one multifaceted apparatus.

The foregoing objectives are realized by providing novel methods and apparatus in which the functions of several distinct production apparatus support four distinct methods in one systematic position.

The inventive apparatus includes an open top production mold forming a three-dimensional cavity, an articulating mix containment cylinder and an articulating mixing apparatus. The apparatus includes the following: (1) The production mold is a conventional box, with a bottom floor surface and four vertical side walls with an open top. (2) The mix containment apparatus consists of a vertically disposed cylinder having open upper and lower ends. Supporting apparatus is configured to articulate the open-ended cylinder up and down, effectively positioning the cylinder inside the larger volume production mold in such a way that the bottom, open end of the cylinder is seated to the floor of the production mold. The support apparatus then effectively removes the cylinder up and out from the seated position on the mold floor to a remote position outside the mold and back again to the seated position in the mold. (3) The mixing apparatus includes motor driven mixing blades or paddles configured at the bottom of a vertically disposed shaft operatively coupled to a motor through the articulating support apparatus. The blades are sized to rotate inside the cylindrical mix container with close tolerances between the blade tips and the interior side of the container.

The mixing apparatus includes four steps in a geopolymer manufacturing method without material handling in between methods, summarized as follows: (1) batch containment, whereby, raw materials for a cementitious formula are batched into the mix containment cylinder seated on the floor of the production mold; (2) lowering a mixing head of the mixing apparatus into the batched materials in the containment cylinder to mix the contents of the cylinder, and after mixing removing mixing head from the cylinder to a remote position; (3) depositing the mixed batch into the production mold by raising and articulating the containment cylinder out of the production mold, leaving the mixed batch on the floor of the mold; and (4) allowing the foam expansion of the deposited batch to fill the production mold.

The further adapted inventive apparatus includes an open top production mold forming a three-dimensional cavity, an articulating mix containment cylinder and an articulating mixing apparatus. The adapted apparatus includes the following: (1) The production mold is a singular multi-cavity mold or a grouped plurality of conventional mold forms with closed bottoms for one or more differently shaped geometries (smaller or larger or in a particular form) (2) The mix containment apparatus consists of a vertically disposed cylinder having an open upper opening and a releasably closeable lower end seal for dispensement. Articulating apparatus are configured to articulate the lower end seal for closure or release, effectively retaining the mix within the vertically disposed cylinder in such a way that the bottom, open end of the cylinder is seal during mixing and released upon articulation. Upon release of the seal, the mix is dispensed to a common opening of an articulated dispensing manifold having a common volume. The dispensing manifold articulates or moves about a rotating access and the common mix is segregated by mix segregators in the manifold during rotation and dispensed from respective segregated mix portions to respective mold cavities. Alternatively, the closable lower end seal is in the form of a dispensing bin having a sealing portion and a dispensing portion. The dispensing portion is divided into individual mix segregators for dispensing into multiple respective mold cavities. The dispensing bin then returns to seal lower end seal of the mix containing cylinder. (3) The mixing apparatus includes motor driven mixing blades or paddles configured at the bottom of a vertically disposed shaft operatively coupled to a motor through the articulating support apparatus. The blades are sized to rotate inside the cylindrical mix container with close tolerances between the blade tips and the interior side of the container and mix the contents therein. Upon completion an additional articulating apparatus removes the mixing blades or paddles from the cylindrical mix container allowing further dispensing.

The further adapted mixing apparatus includes further steps in a geopolymer manufacturing method without material handling in between methods, summarized as follows: (1) batch containment, whereby, raw materials for a cementitious formula are batched into the mix containment cylinder seated on the floor of the production mold; (2) lowering a mixing head of the mixing apparatus into the batched materials in the containment cylinder to mix the contents of the cylinder, and after mixing removing mixing head from the cylinder to a remote position leaving the mixed batch within the cylinder; (3) depositing the mixed batch from the cylinder into a segregated form directly to production molds, either directly by a segregating deposition bin seal with a segregating dividers to meet with the molds or through an articulated dispensing manifold into multiple the production molds; and (4) allowing the foam expansion of the deposited batch to fill the production mold.

The further adaptive, optional, and alternative embodiments herein provide a vertically disposed, mixing containment cylinder or container having an open top and an open bottom, wherein; said open top is configured to received dose batched materials and a mixing apparatus and said open bottom is configured to achieve a sealing engagement with an operable containment floor that opens and closes for containment and deposition of mixed material batches; a segregating, deposition cylinder or manifold is positioned below or downstream said mixing containment cylinder, configured as an empty, horizontally disposed, modified cylinder having opposing, containing end walls and the perimeter bounding wall of the modified cylinder is configured with an opening within a portion of its circumference for receiving a mixed batch; wherein the opening is configured to engage an operable containment floor at the bottom of said mixing containment cylinder, and to receive deposition of the mixed dose material batch from said vertically disposed, mixing, containment cylinder into the lower portion of the horizontally disposed, segregating, deposition cylinder. Wherein, the horizontally disposed, segregating, deposition cylinder is supported at and configured to rotate about its rotation axis, and has multiple, dividing, partition walls proximate a dispensing opening. Wherein said dividing, partition walls run perpendicular to said horizontal axis for a radial portion of the cylinder's circumference. Wherein, said dividing partitions approximate the upper portion of said modified cylinder, effectively dividing said radial portions of the cylinders volume into multiple, equal or particular divisions.

According to another adaptive and optional embodiment of the present invention, there is provided a multi-cavity mold positioned below the segregating, deposition cylinder wherein the multiple cavities of the multi-cavity mold are configured to correspond with said equal or particular divisions of the segregating, deposition cylinder and receive deposition of the equal or selected particular volume divisions of the mixed batch materials.

According to another adaptive and optional embodiment of the present invention, there is provided a multi-station system for producing millable geopolymer foam blocks, wherein the mixed material batch of the vertically disposed, mixing containment cylinder is deposited into the horizontally disposed, segregating, deposition cylinder. Whereby, the modified cylinder is rotated about its cylindrical axis and the dividing partitions approximating the upper portion of said modified cylinder are rotated down and through the mixed batch remaining in the lower portion of said segregating, deposition cylinder and the operation of the rotation is operative to effectively divide the mixed batch deposits into equal or particular divisions of mixed material into respective designated multiple cavity molds having correspondingly equal or particular volume divisions, configured below the segregating deposition cylinder.

According to another adaptive and optional embodiment of the present invention, there is provided a system wherein an operable containment and deposition floor seal is configured to open and close and is facilitated with a hinged connection.

According to another adaptive and optional embodiment of the present invention, there is provided a system wherein the operable containment and deposition floor seal is configured to slide open and closed and adaptively provided with a generally plainer floor contained and guided in opposing congruently aligned tracks.

According to another adaptive and optional embodiment of the present invention, there is provided a system and apparatus wherein the operable containment and deposition floor or seal is configured to open and close and is also configured to include a shunt, guide, ramp, or chute to contain and guide deposition of a mixed batch into a segregating deposition cylinder.

According to another adaptive and optional embodiment of the present invention, there is provided a system and apparatus wherein the operable containment and deposition floor configured to slide open and closed also includes a containment chute positioned below the operable sliding floor and configured to contain and guide deposition of said mixed material batch into the segregating deposition cylinder.

According to another adaptive and optional embodiment of the present invention, there is provided a system and apparatus wherein the horizontally disposed, segregating, deposition cylinder is substantiated as a half cylinder; wherein radial portions of said dividing partitions approximate half of the half cylinder.

According another adaptive and optional embodiment of the present invention, there is provided a system for producing thermal insulating, architectural, and structural foam, the system having multiple stations in a production loop, said system comprising: an open top production mold assembly with a plurality of individual molds each having respective open tops and floors; a vertically oriented mix containment cylinder having an open top and an open bottom, and a bottom edge configured for sealing engagement with a releasable containing seal controlling a dispensement of a mixed batch; said releasable containing seal and having a sealing portion directly sealing said bottom edge and a dispensing guide portion extending away from said sealing portion; a seal releasing system for articulating said releasable containing seal between a sealed position and an unsealed to dispense said mixed batch; a material deposition subsystem including movable hoppers for containing and dispensing bulk materials into said mix containment cylinder; a motorized mixing apparatus having a rotating head; a mechanism for lowering and raising said rotating head into and from said mix containment cylinder for operation of said rotating head in said mix containment cylinder and providing said mixed batch; a segregating dispensing manifold bounding an inner volume and having an entry opening formed to receive said mixed batch from said dispensing guide portion of said releasable containing seal and an exit with a plurality of dividing partitions formed to dispense partitioned mixed batch portions to respective open tops of said plurality of individual molds upon a rotation of said segregating dispensing manifold; and at least one conveyance mechanism for moving one or more of said plurality of individual molds, said mix containment cylinder, said mixing apparatus, said material deposition subsystem, said seal release system, and said segregating dispensing manifold into positions relative to one another for sequential operations.

According another adaptive and optional embodiment of the present invention, there is provided a system wherein: said segregating dispensing manifold rotates on a pivot axis from a fill position to a dispensing position.

According another adaptive and optional embodiment of the present invention, there is provided a system, wherein: said dividing partitions extend within said inner volume perpendicular to said pivot axis of said segregating dispensing manifold; and whereby when said segregating dispensing manifold rotates about said pivot axis said dividing partitions rotate through said mixed batch and partition said mixed batch to said respective individual molds.

According another adaptive and optional embodiment of the present invention, there is provided a system, wherein: said at least one conveyance mechanism includes a conveyor disposed on a production floor and on which said plurality of individual molds are disposed for moving in relation to said mix containment cylinder, said mixing apparatus, and said segregating dispensing manifold.

According another adaptive and optional embodiment of the present invention, there is provided a system, wherein: said at least one conveyance mechanism is selected from a heavy duty bulk material handling industrial conveyor, consisting of a roller conveyor, a steel belt conveyor, or a roller chain conveyor.

According another adaptive and optional embodiment of the present invention, there is provided a system, wherein: said at least one conveyance mechanism is configured to articulate said releasable containing seal and said segregating dispensing manifold about said pivot axis whereby said mixed batch is dispensed from said mix containment cylinder to said respective individual molds.

According another adaptive and optional embodiment of the present invention, there is provided a system, wherein: said releasable containing seal directly sealing said bottom edge of said mix containing cylinder is formed as an open topped bin with bounding guide walls proximate said sealing portion and an open mouth portion as said dispensing guide portion extending away from said sealing bottom.

According another adaptive and optional embodiment of the present invention, there is provided a system, wherein: said releasable containing seal directly sealing said bottom edge of said mix containing cylinder is formed as one of a sliding gate slidable relative to said bottom edge and a hinged floor pivotable relative to said bottom edge.

According another adaptive and optional embodiment of the present invention, there is provided a multi-station system for producing millable geopolymer foam blocks comprising: an open top production mold assembly with a plurality of individual molds each having respective open tops and respective floors; a vertically oriented mix containment cylinder having an open top and an open bottom, and a bottom edge configured for sealing engagement with a releasable containing seal controlling a dispensement of a mixed batch; said releasable containing seal and having a sealing portion directly sealing said bottom edge and a dispensing guide portion extending away from said sealing portion; a material deposition subsystem including movable hoppers for containing and dispensing bulk materials into said mix containment cylinder; a motorized mixing apparatus having a rotating head; a mechanism for lowering and raising said rotating head into and from said mix containment cylinder for operation of said rotating head in said mix containment cylinder and providing said mixed batch; a segregating dispensing manifold bounding an inner volume and having an entry opening formed to receive said mixed batch from said dispensing guide portion of said releasable containing seal and an exit with a plurality of dividing partitions formed to dispense partitioned mixed batch portions to respective open tops of said plurality of individual molds upon a rotation of said segregating dispensing manifold; and at least one conveyance mechanism for moving one or more of said plurality of individual molds, said mix containment cylinder, said mixing apparatus, said material deposition subsystem, and said segregating dispensing manifold into positions relative to one another for sequential operations.

According another adaptive and optional embodiment of the present invention, there is provided a system for producing thermal insulating, architectural, and structural foam, the system having multiple stations in a production loop, said system comprising: an open top production mold assembly with a plurality of individual molds each having respective open tops and respective floors; a vertically oriented mix containment cylinder having an open top and an open bottom, and a bottom edge configured for sealing engagement with a releasable containing seal controlling a dispensement of a mixed batch; said releasable containing seal and having a sealing portion directly sealing said bottom edge and a dispensing guide portion extending away from said sealing portion; a seal releasing system for articulating said releasable containing seal between a sealed position and an unsealed position and pivoting said releasable containing seal from said unsealed positioned to a dispensing position about a seal release pivot axis to dispense said mixed batch; a material deposition subsystem including movable hoppers for containing and dispensing bulk materials into said mix containment cylinder; a motorized mixing apparatus having a rotating head; a mechanism for lowering and raising said rotating head into and from said mix containment cylinder for operation of said rotating head in said mix containment cylinder and providing said mixed batch; a plurality of dividing partitions on said dispensing guide portion of said releasable containing seal that receive said mixed batch from said mix containment cylinder and partition said mixed batch into a respective plurality of partitions for respective said individual molds upon said pivot of said releasable containing seal from said unsealed position; and at least one conveyance mechanism for moving one or more of said plurality of individual molds, said mix containment cylinder, said mixing apparatus, said material deposition subsystem, and said seal release system relative to one another for sequential operations.

According another adaptive and optional embodiment of the present invention, there is provided a system, wherein: releasable containing seal is formed as an open topped bin with bounding guide walls proximate said sealing portion and an open mouth portion as said dispensing guide portion extending away from said sealing bottom; and said dividing partitions on said dispensing guide portion extending orthogonal to said seal release pivot axis whereby said mixed batch is segregated by the motion of the mixed batch along said dispensing guide portion toward said open tops of said respective individual molds.

According another adaptive and optional embodiment of the present invention, there is provided a system, wherein: said at least one conveyance mechanism includes a conveyor disposed on a production floor and on which said plurality of individual molds are disposed for moving in relation to said mix containment cylinder, said mixing apparatus, and said releasable containing seal.

According another adaptive and optional embodiment of the present invention, there is provided a system, wherein: said at least one conveyance mechanism is selected from a heavy duty bulk material handling industrial conveyor, consisting of a roller conveyor, a steel belt conveyor, or a roller chain conveyor.

According to a further adaptive and alternative embodiment, there is provided a multiple step and multi-stage system for mixing single batch, geopolymer foam or preferred production mortars and concrete materials, and rapidly dividing and dispensing the geopolymer foam or production mortars and concrete materials into multiple batches of equal or particular volumes in multiple cavity molds of correspondingly equal or particular adaptive and selected volumes.

Other novel features characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration and description only and are not intended as a definition of the limits of the invention. The various features of novelty which characterize the invention are pointed out with particularity in the claims annexed to and forming part of this disclosure. The invention resides not in any one of these features taken alone, but rather in the particular combination of all of its structures for the functions specified.

The above and other aspects, features, objects, and advantages of the present invention will become apparent from the following description read in conjunction with the accompanying drawings for exemplary but nonlimiting embodiments, in which like reference numerals designate the same elements.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE PREFERRED EMBODIMENTS

Figure 1:
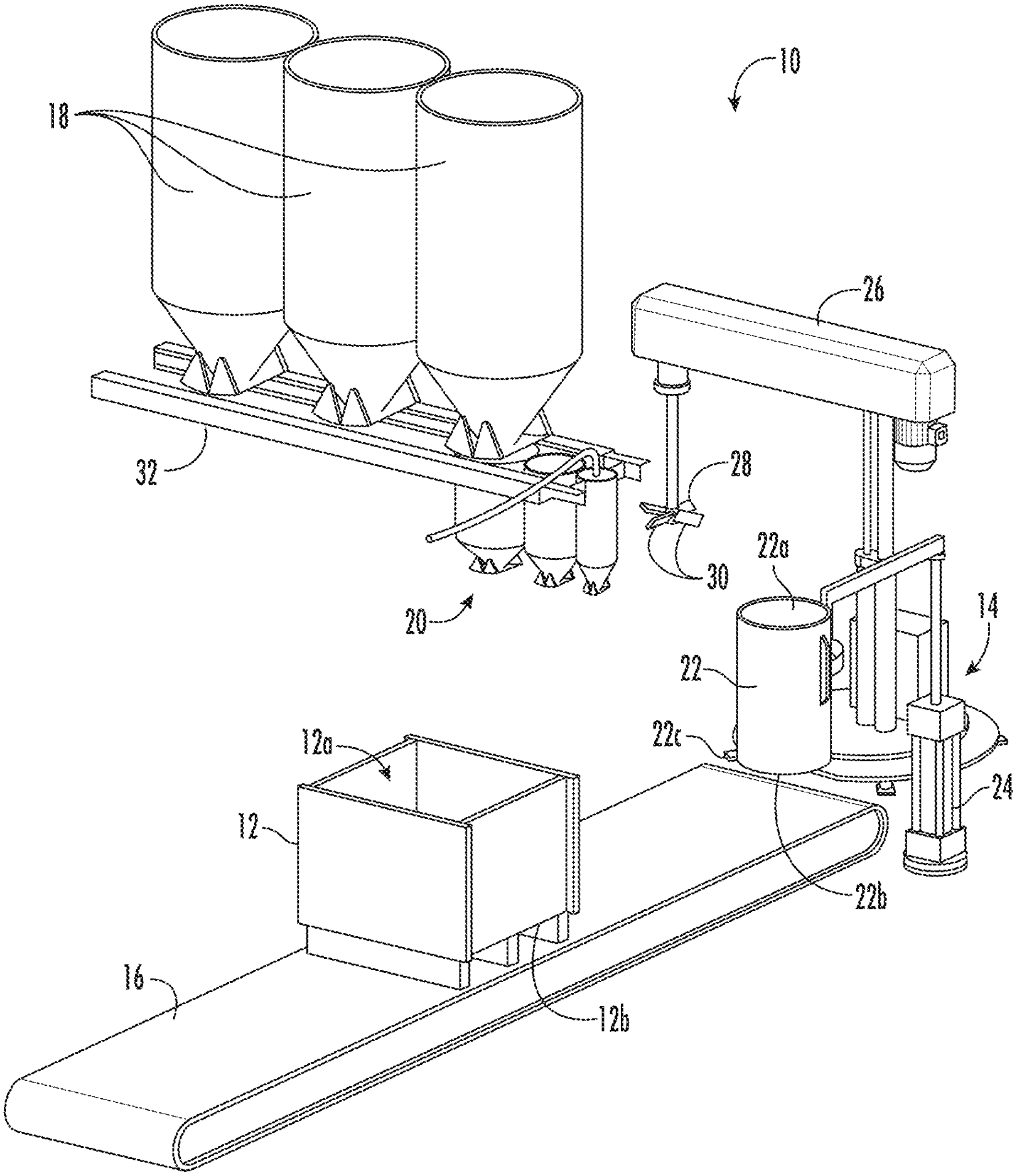
FIG. 1 is a highly schematic upper perspective view showing the geopolymer foam mixing and deposition system and apparatus of the present invention.

Referring to the figures, wherein like reference numerals refer to like components in the various views, it will be seen that the inventive system includes a system and apparatus 10 for producing large volume, expanded geopolymer foam pieces—blocks for example—intended for a subsequent milling process. Products or product parts are milled from large volume blocks of the molded expanded foam.

The system includes three general production phases.

Phase 1—Batching, Mixing, and Inoculation: An expansion containment mold (i.e., a production mold) 12 is moved into mixing/deposition station 14 using variations of a heavy duty bulk material handling industrial conveyor 16, such as but not limited to a roller conveyor, steel belt, flat slider, or roller chain conveyor, disposed on a production floor. In embodiments, at the mixing/deposition station, bulk materials may be moved into position for dispensing into a container disposed below using an overhead gantry.

The production mold includes an open top 12*a* and a generally planar floor 12*b*. Chemical constituents of a cementitious and/or geopolymer mix are batched, mixed, and inoculated with a foam forming agent delivered overhead using both bulk hoppers 18 and dose hoppers 20. Immediately after the constituents are deposited into the mold, the foaming agent is integrated throughout the mix.

Figure 2:
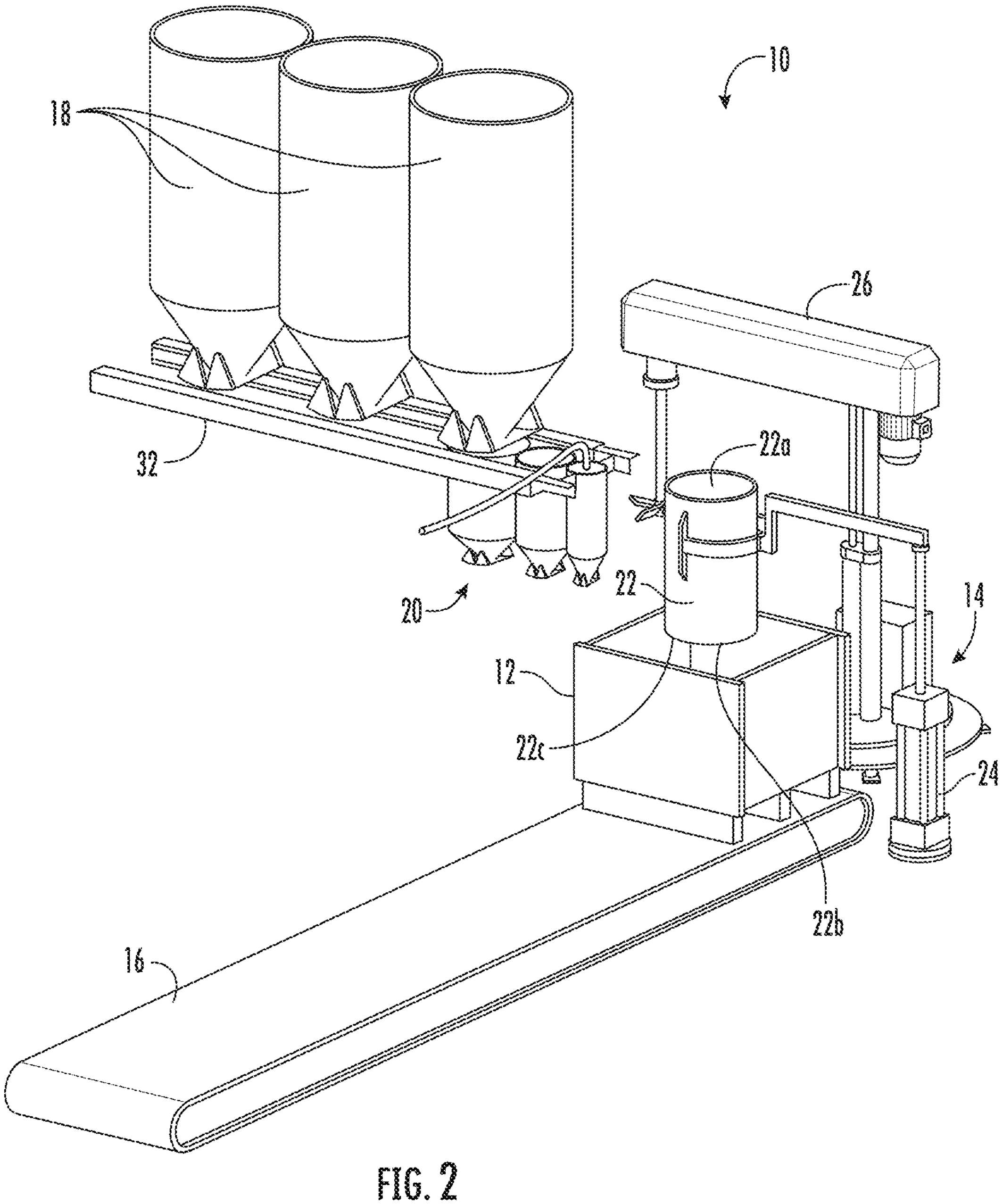
FIG. 2 is the same view showing an (expansion containment) production mold moved into place at a batching and mixing station and a mix containment cylinder moved into place and poised above the production mold before being lowered into the production mold.
Figure 3:
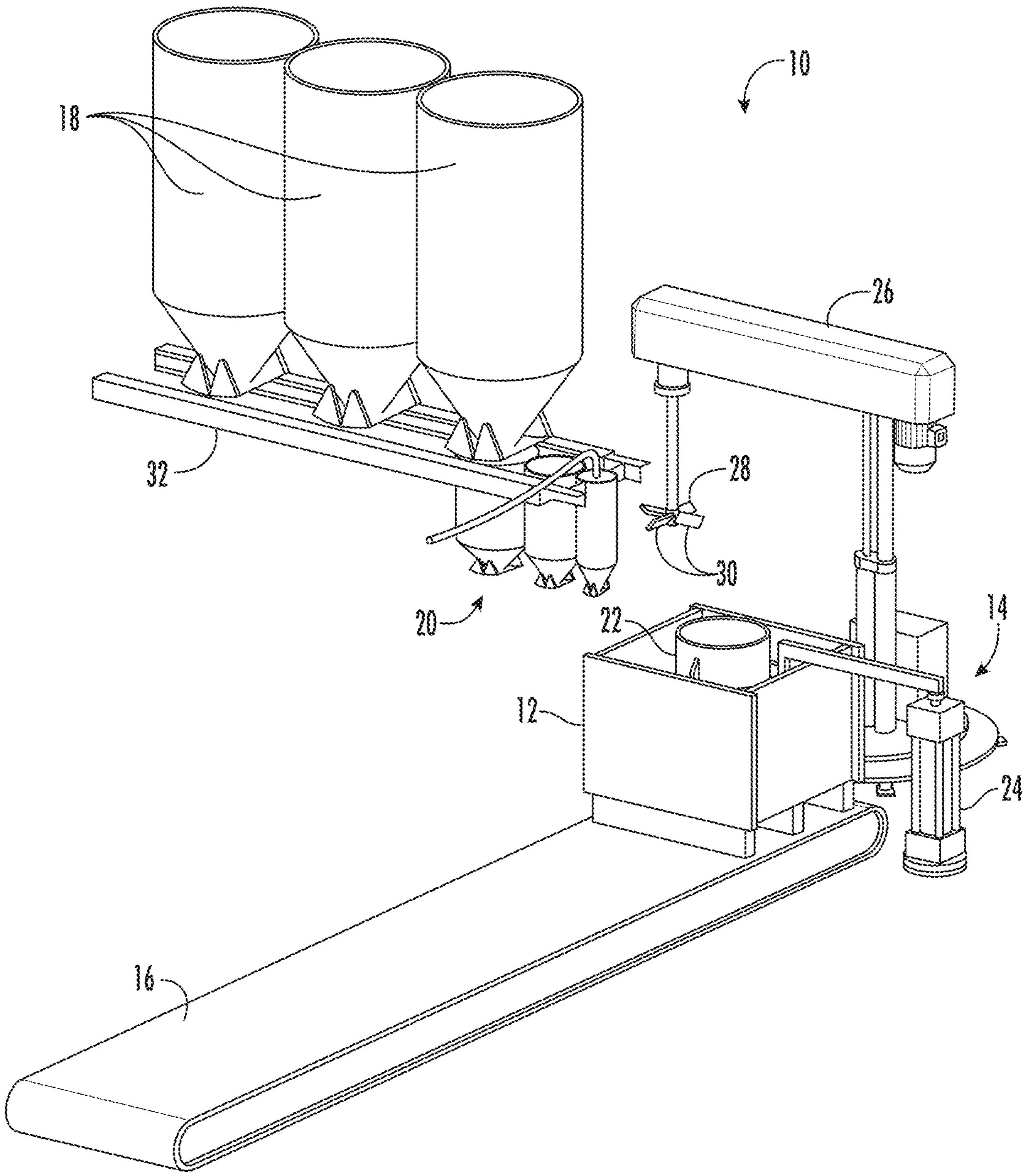
FIG. 3 is the same view showing the mix containment cylinder lowered into the production mold and readied for deposition and inoculation with the foam constituents.
Figure 4A:
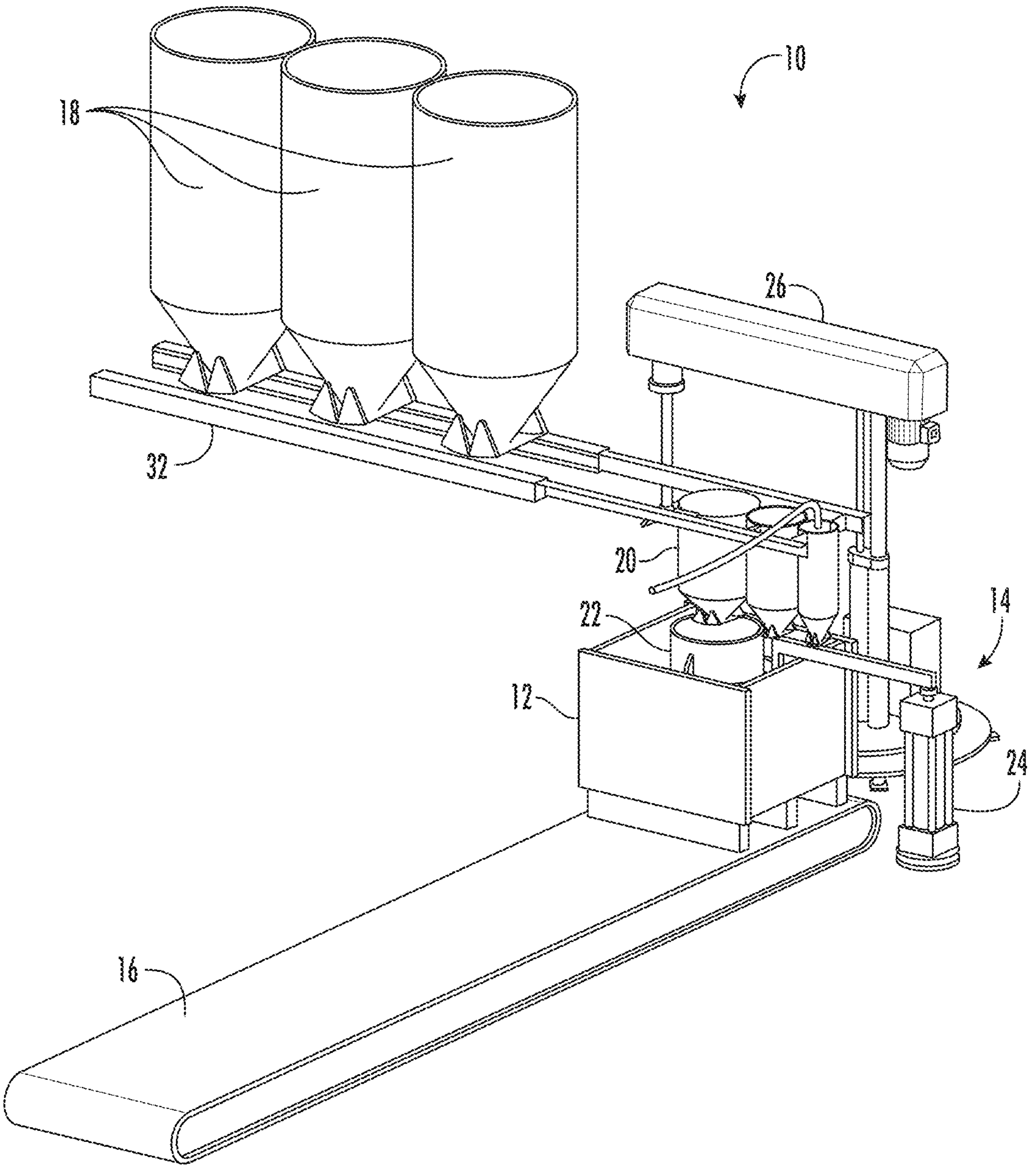
FIGS. 4A-4C are various views showing one of the dose hoppers positioned above the mix containment cylinder for introduction of mix components and an inoculant during dosing.
Figure 4B:
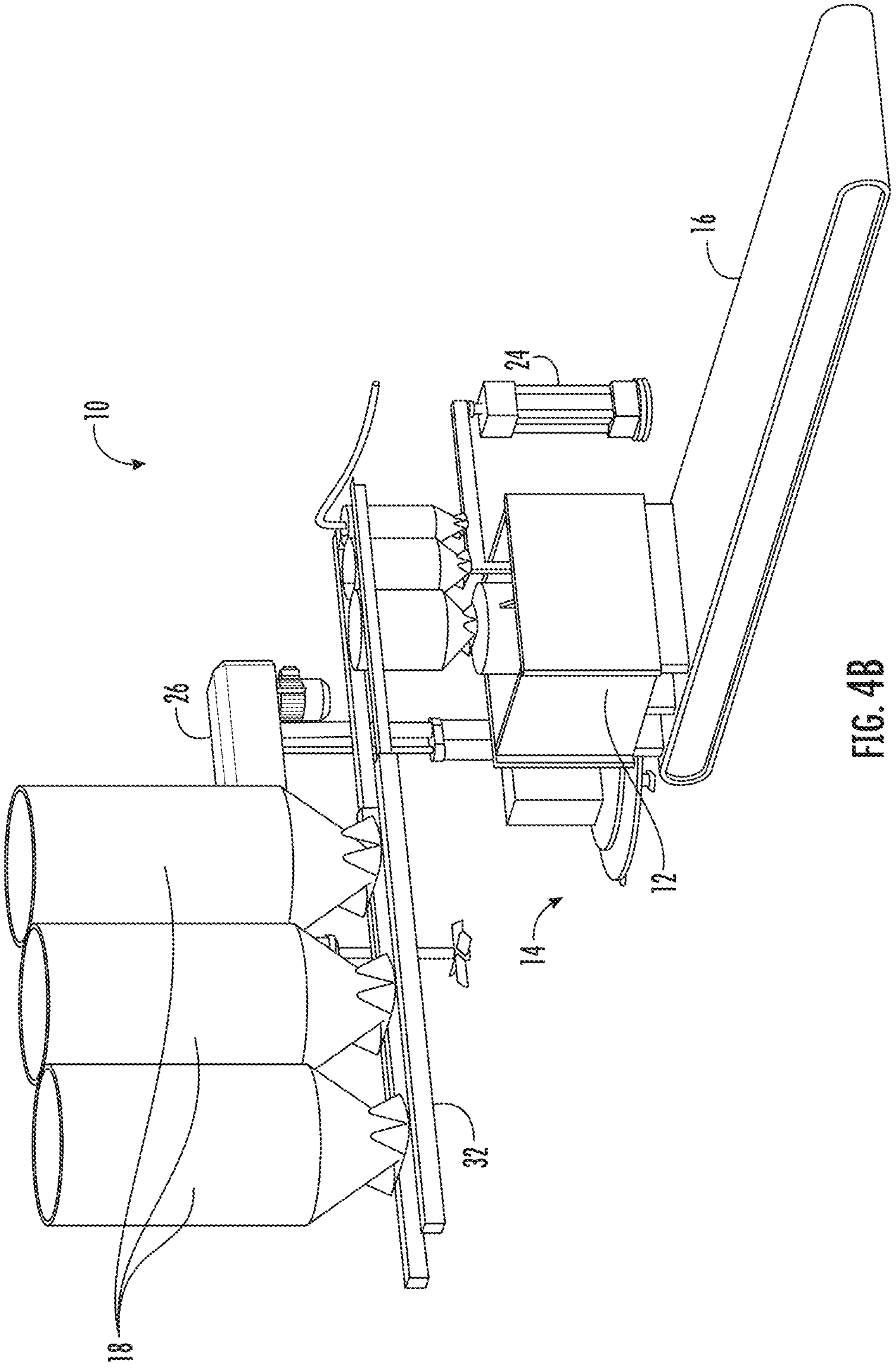
Figure 4C:
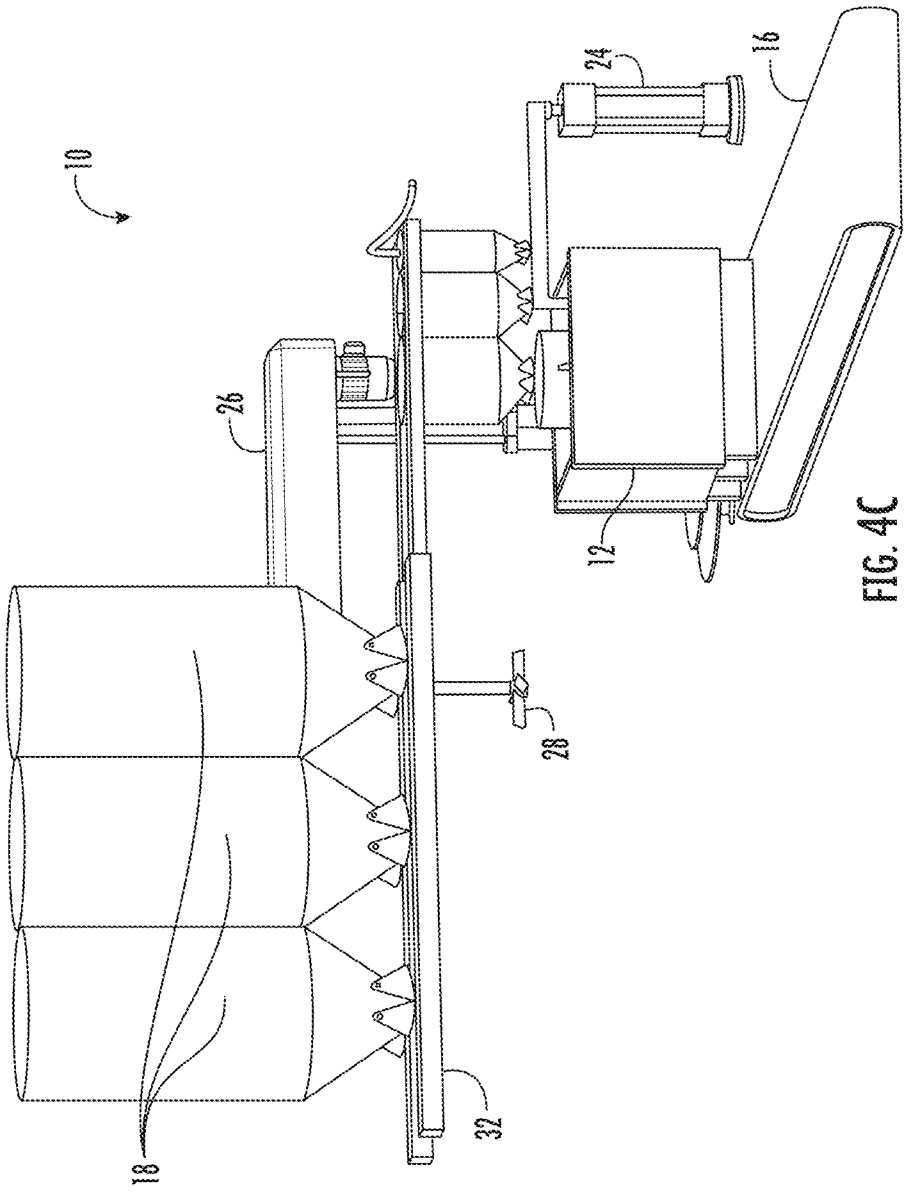

The process in Phase 1 is completed in a removable mix containment cylinder 22 having an open top 22*a* and an open bottom 22*b*, but which is moved into place and into sealing engagement at its bottom edge 22*c* with the planar floor or bottom 12*b* of the larger volume production mold using a pivoting arm and mix containment cylinder actuator 24. A motorized mixer 26 having a head 28 with a plurality of mixing blades or paddles 30 is then rotated into place and the blades lowered into the mix containment cylinder 22. The mixer 26 is operated until the composition constituents are generally uniformly mixed. [See FIGS. 1-3.]

As with the production mold, the bulk and dose hoppers 18, 20 may be either permanently positioned or selectively moved into place, depending on material conveying means selected for production and whether flowable materials can be pumped from the hoppers into the pre-mix cylinder when in the mixing/batching station. If movement of the hoppers is optimal, an overhead bridge or gantry crane 32 or functional equivalent may be employed.

Figure 5:
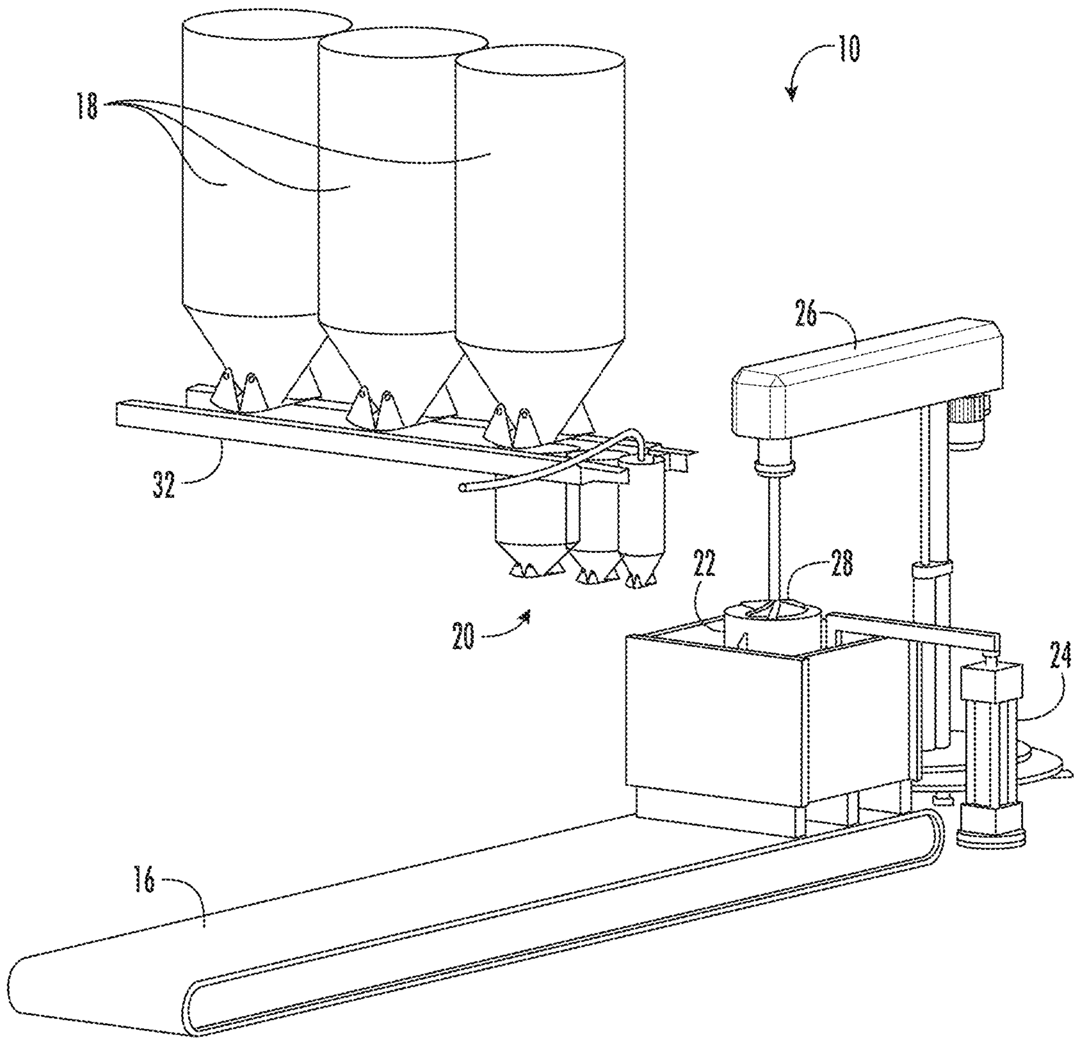
FIG. 5 is an upper perspective view showing the mixing head poised above the mix containment cylinder, as it would be immediately prior to mixing or immediately after.
Figure 6:
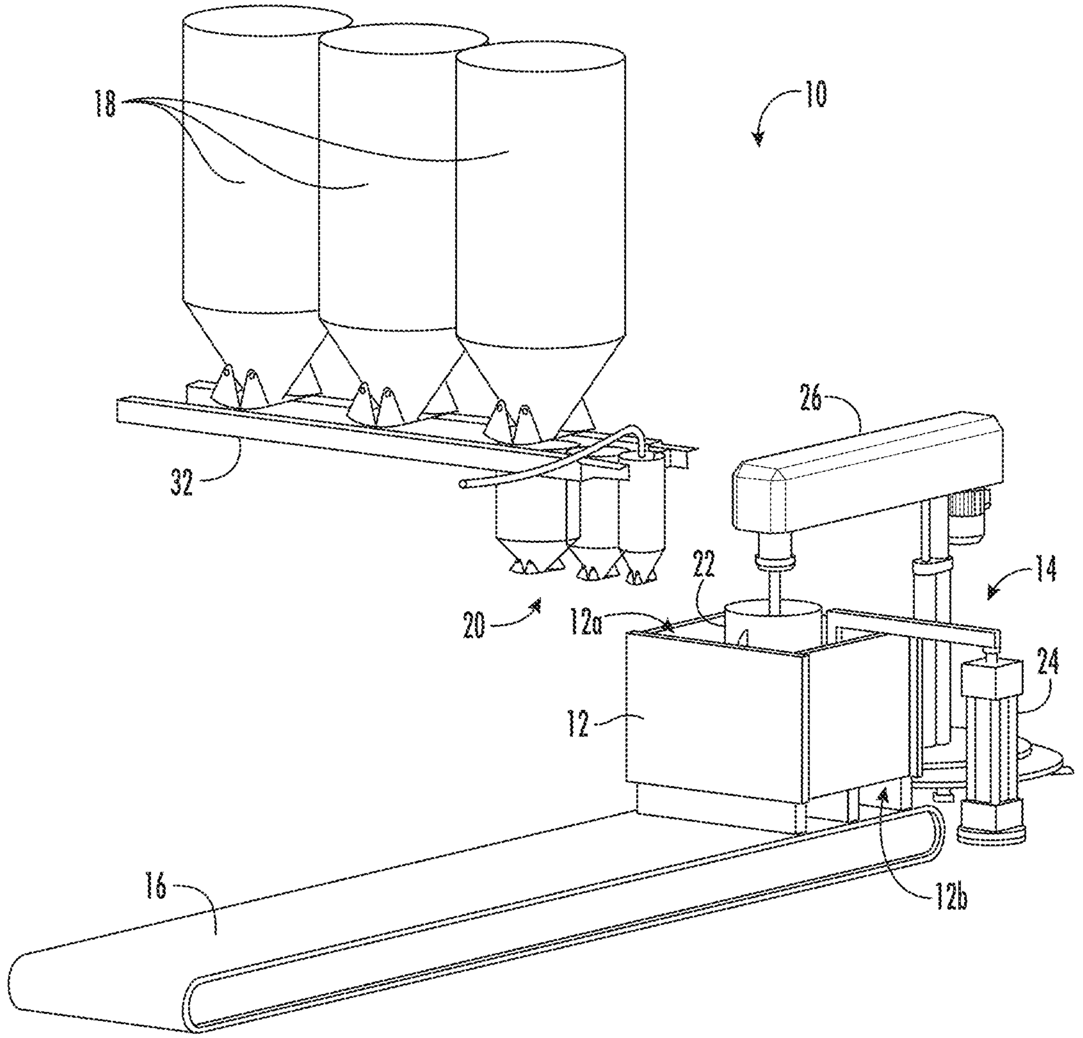
FIG. 6 shows the mixing head lowered into the pre-mix cylinder for mixing.
Figure 7:
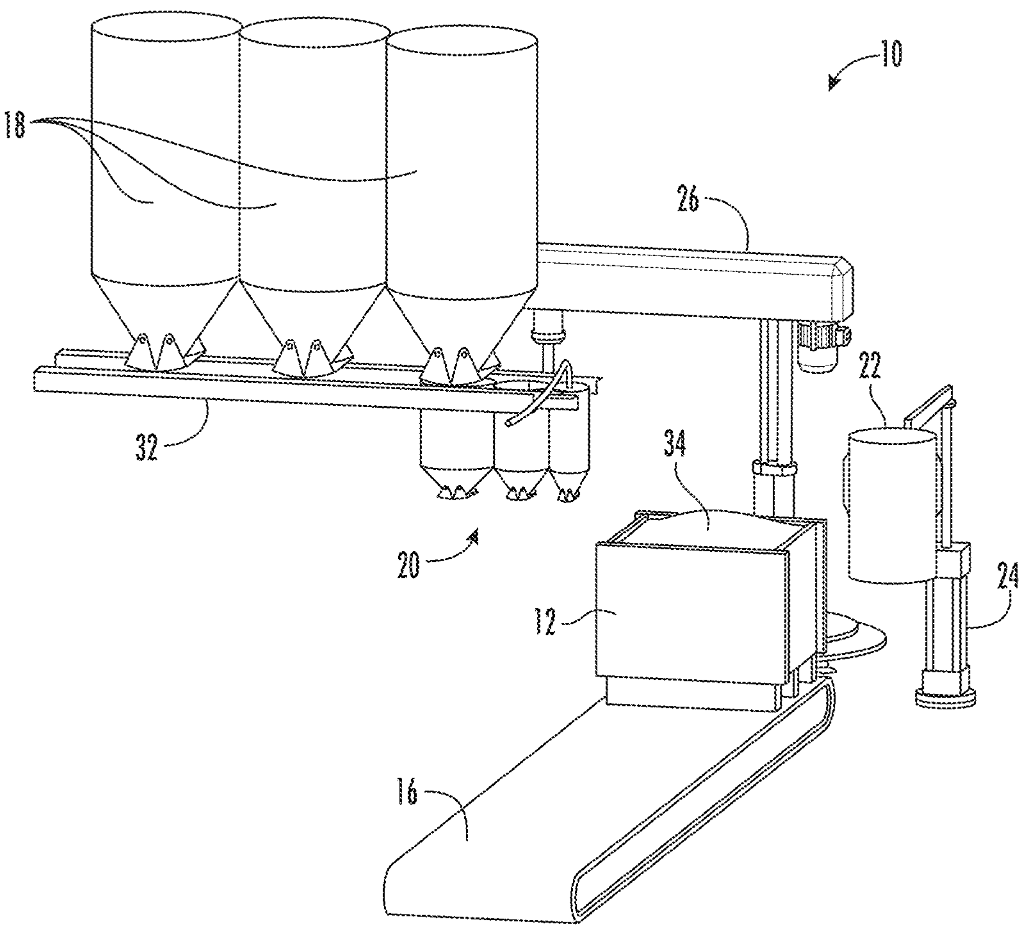
FIG. 7 is an upper perspective view showing the mix containment cylinder removed from the production mold and the expansive geopolymer foam mix expanding and/or expanded into the confines of the production mold.

Phase 2—Deposition: In this phase, the seated mixer is first elevated from and rotated away from the mix containment cylinder, and the mix containment cylinder is then removed from the production mold floor and elevated vertically, up and out of the production mold. This results in the immediate deposition of the inoculated mix through the open bottom of the cylinder into the production mold, inducing immediate foam expansion and initial set of a molded product without having to move the inoculated wet mix from the mixer to the mold. [See FIGS. 5-7.]

Phase 3—Transport and De-Molding: After the geopolymer foam constituents have been thoroughly batched, inoculated, and mixed [see FIG. 7], the expanding geopolymer foam product 34 is allowed to go through stages of curing, either in the mixing/batching station 14 or elsewhere. If the production mold 12 is to be moved to a curing station or environment, it is conveyed from the mixing/deposition station 14 through a loop. At a first stop the product mold remains in a curing environment where the expanded foam product undergoes an initial (in-mold) cure. This is followed by a brief migration out of the curing environment for de-molding, product removal, and mold reassembly. The de-molded foam product is then routed back to a curing environment for a final cure, and the production mold is cycled back into the production loop after any needed attention for cleaning or shape modification.

This production system provides millable foam stock to a production and milling facility with equipment for cutting and milling products or product parts from the foam stock.

Production System Apparatus: The production system of the present invention comprises the following primary subsystems: (1) a production mold; (2) a retractable mix containment cylinder; (3) a deposition and dosing system; and (4) a mixing apparatus. These are described more fully below.

Production Mold: In embodiments, the production mold may consist of a variety of sizes and shapes but the preferred embodiment will be substantially cubical consisting of a flat bottom floor surface, four, flat side walls extending vertically and an open top to accommodate the methods and apparatus for batching, mixing and deposition, and the facilities for foam expansion and initial curing of a millable foam product; the production mold is a sectional assembly configured in such a way as to allow manual or automated disassembly of the mold, removal of the expanded foam product and re-assembly of the mold for continued use. The production mold is configured to be independent from an articulating batching and mixing apparatus and the retractable mix containment cylinder so that multiple production molds can be concurrently used in production by either manual or automated conveyors. The molds are conveyed into position to be engaged first by the mix containment cylinder and then the batching and mixing apparatus, one at a time for (phases 1 and 2) of production loop. Upon the completion of phases 1 and 2, the molds is conveyed in order through the production loop stations.

The production mold components may optionally include a composite wall design with internal heating elements for expedited curing and product removal.

Mix Containment Cylinder: In embodiments, the retractable mix containment cylinder includes a cylinder dimensioned to have a volume suitable for containment of the mixing apparatus and the size of the batch to be mixed. The cylinder walls are disposed vertically and open at both the top and bottom ends of the cylinder. The mix containment cylinder is configured to articulate up and down to allow insertion into the production mold and to be sealingly disposed tightly against the bottom or floor of the production mold. This leaves only an open top through which a mixing head can be passed and through which cementitious and/or geopolymer batch materials can be deposited, mixed and then inoculated with a foaming agent. After inoculation, additional mixing is immediately employed to fully integrate the foaming agent evenly throughout the batch. The mixing blades and mix containment cylinder are then retracted upward and out of the production mold, thereby returning it to a remote position and leaving the inoculated batch in the production mold. The deposited and mixed batch may remain in this station to expand unimpeded with the production of foam to fill the production mold, or it may be conveyed to a curing station to undergo its first stage of curing.

Mixing Apparatus: In embodiments, the mixing apparatus may consist of a single axis or a multiple axis or planetary blade or paddle type mixer configured to move from a remote location to a position above the mix containment cylinder and then configured to move up and down in-line with its rotational axis and effectively in and out of the mix containment cylinder seated in the production mold, and then back again to a remote position.

Raw Material Deposition: The deposition system may include multiple bulk material containers and material conveying apparatus designed to accommodate wet and dry materials. Preferably, the deposition system is configured to move independently from a remote position to a position placing material hoppers above the mix containment cylinder disposed in the production mold. There the mix component materials may be deposited and mixed. After deposition and inoculation, the raw material deposition apparatus is conveyed back to a remote position.

Methods associated with the above apparatus are described in the following steps.

The mixing and batching apparatus 10 and the mix containment cylinder are temporarily disposed in remote positions allowing the production mold to be conveyed into place at the mixing/deposition station.

The mix containment cylinder is then moved into place above the production mold and articulated down into the mold wherein the open bottom of the cylinder is seated tightly to the mold floor.

Premix deposition fixtures are then moved into place above the mix containment cylinder from a remote position to deposit the wet and dry components of the cementitious and/or geopolymer formula into the mix containment cylinder seated on the floor of the production mold and then returning to their remote positions after the premixed batch is fully deposited.

The mixing apparatus is then moved into place above the mix containment cylinder and articulated down into the batched materials contained in the mix containment cylinder to mix components therein.

Another deposition fixture is then moved into place above the mix containment cylinder to inoculate the batch with a foam forming additive. After deposition of the inoculants, it is returned to a remote position. The mixer is again employed to mix material components until the foaming additive is fully dispersed throughout the batch. The mixing head is then articulated up and out of the inoculated mix and returned to its remote position.

Immediately after the mixing apparatus is removed, the mix containment cylinder is articulated up and out of the production mold simultaneously allowing the inoculated mix to spill out the bottom of the cylinder into the larger production mold wherein the inoculated mix then expands with the production of foam; filling the production mold with the cementitious and/or geopolymer foam.

The production molds are of variable sizes and shapes depending on batch formulation and projected percentage of expansion.

The filled production mold (curing or cured) is then conveyed to an initial (in mold) curing environment until the expanded foam has reached its initial set and is ready for removal.

After the initial (in-mold) cure cycle is completed, the production mold is removed from the (in-mold) curing environment and the expanded foam is removed from the production mold. The expanded foam block is routed to a final curing environment and the production mold is re-assembled and routed back through the production loop for reuse.

The foregoing disclosure is sufficient to enable those with skill in the relevant art to practice the invention without undue experimentation. The disclosure further provides the best mode of practicing the invention now contemplated by the inventor.

While the particular apparatus and method herein shown and disclosed in detail is fully capable of attaining the objects and providing the advantages stated herein, it is to be understood that it is merely illustrative of the presently preferred embodiment of the invention and that no limitations are intended to the detail of construction or design herein shown other than as defined in the appended claims. Accordingly, the proper scope of the present invention should be determined only by the broadest interpretation of the appended claims so as to encompass all such modifications as well as all relationships equivalent to those illustrated in the drawings and described in the specification.

Additionally, referring further now to FIGS. 8A through 8C, and FIGS. 9A through 10, further alternatives to the prior discussed the geopolymer foam deposition and mixing system and apparatus are provided at 10A for producing smaller size expanded geopolymer foam pieces, blocks for example, intended for subsequent processes. Similar phases and steps are pursued except where they differ from the discussion that follows so that those of skill in this art will be able to integrate and appreciate the improvements to the geopolymer foam deposition and mixing system and apparatus herein.

Similar to the above, bulk hoppers 18 operate with dose hoppers 20 and a mixer 26 having mixing blades 30 operates relative to a mixing deposition station 14 as noted above with a pivoting arm and mix containment cylinder actuator 24.

The production mold 112 includes a plurality of single mold cavities 112*c* (See FIGS. 8A, 8B) each with a respective open top 112*a* and a planar floor 112*b*. Production mold 112 may adaptively be a series of individual mold cavities 112*c* retained for production (See FIG. 8C) but separable as individual molds 112*c*. A mix containment cylinder 222 has an open top 222*a* and an open bottom 222*b* that may be sealed in alternative manners to be discussed herein in addition to contact with the bottom floor of the production mold noted above. The seal of the open bottom 222*b* is achieved with a sealing engagement with an operable releasable containment seal 400 as will be discussed herein and below, and which is actuated by a seal mechanism 401 positioned proximate to and operative with the actuator 24 so as to release the operable releasable containment seal 400 for disbursement of the mixed batch, as will be discussed further below. The open top 222*a* is configured to receive dose batch materials and mixing apparatus mixing blades 30 and a head 28.

It will be apparent that unlike the prior embodiment in FIGS. 1-7, after the mixing apparatus is removed from the mix containment cylinder, the mix containment cylinder is positioned with a sealed bottom relative to the production molds and therefore a transport of the mixed batch needs transport from the open bottom 222*b* to the respective molds and the enclosed improvements provide adaptive arrangements for this transport through releasing seals, hoppers, and otherwise as will be discussed herein.

Figure 8A:
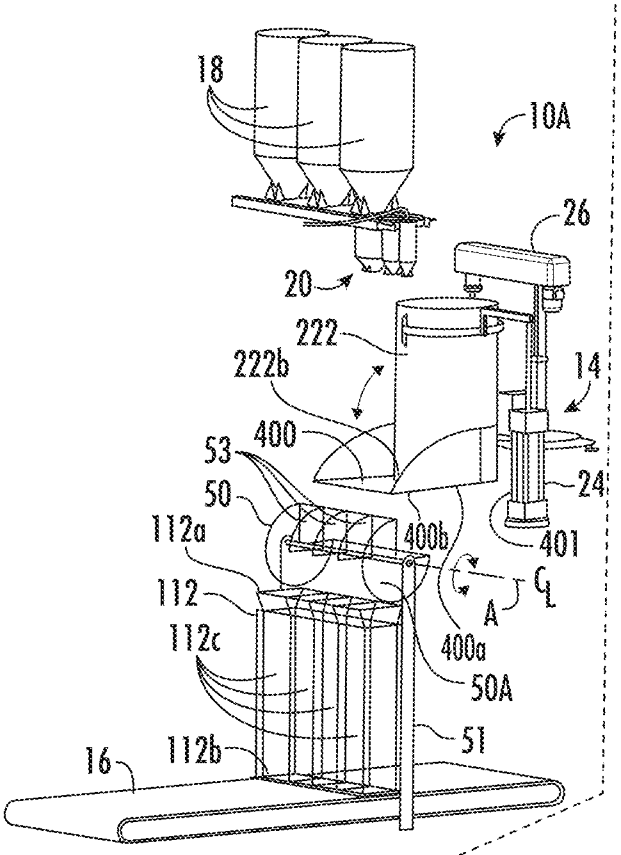
FIGS. 8A, 8B, and 8C are schematic perspective views showing an additional adaptive geopolymer foam mixing and depositing system and apparatus of the present invention with dispensement from the mix containment cylinder into multiple mold cavities.
Figure 8B:
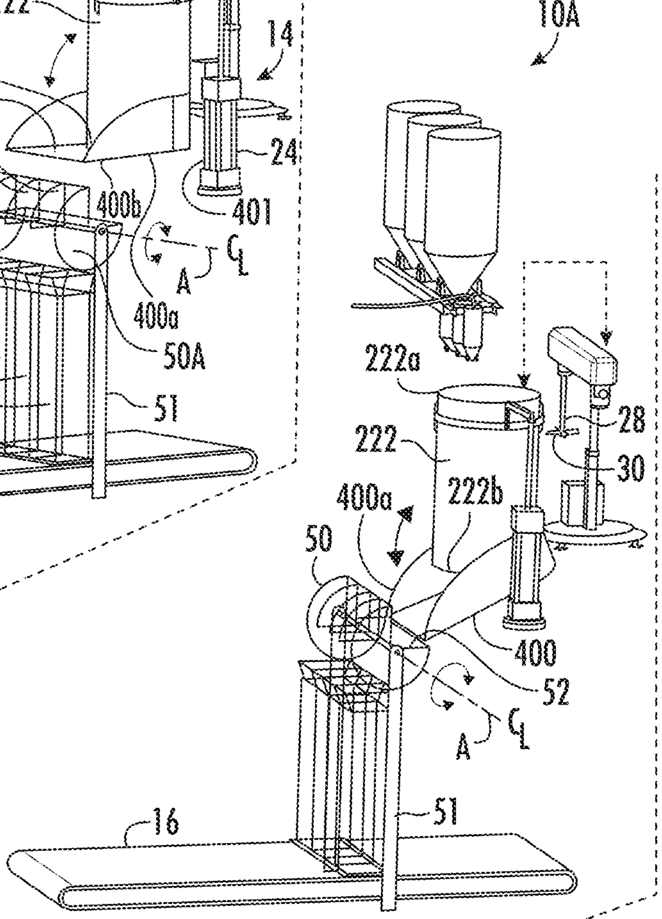
Figure 8C:
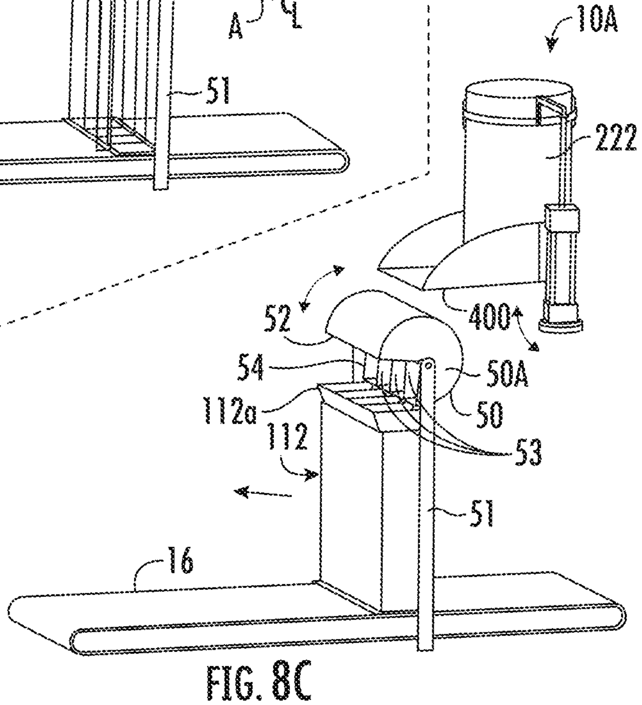

Operable releasable containment seal 400 is shown in FIGS. 8A-8C in an extended hopper form with a sealing portion 400*a* directly sealing bottom 222*b* and a dispensing guide portion 400*b* extending way from sealing bottom 222*b* so as to guide the mixed dose batch materials outwardly away from mix containment cylinder 222 as will be discussed. It will be alternatively and adaptively realized that operable and releasable containment seal 400 may take other forms and shapes effective to seal bottom 222*b* during mixing and batch preparation before dispensement without departing from the teaching and scope of the present invention. As non-limiting examples, operable and releasable containment seal 400 may be a sliding gate or floor arrangement, or a hinged floor arrangement where two double hinged gates directly release the mix. It will be further appreciated by those of skill in the art having studied the combined disclosure herein that additional sealing mechanisms and mix-dispensing guides, channels, or passages linking mix containment cylinder 222 to molds 112 guides may be adaptively provided while remaining with the scope and spirit of the present invention.

As noted in FIGS. 8A-8C, a rotating segregating dispensing manifold 50 is positioned on a support and articulation apparatus 51 proximate and downstream of mixing containment cylinder 222 as a horizontally disposed modified cylinder having a pivot axis A, and opposed end walls 50*a*, 50*a* that define a bounded common volume therein. Support and articulation apparatus 51 has rotation control systems, for example a tooth and cog or belt/wheel arrangement for controllably causing the rotation of dispensing manifold 50 about pivot axis A during a dispensing event.

A receiving opening 52 on rotating segregating dispensing manifold 50 receives the mixed dose batch materials from dispensing guide portion 400*b* of operable releasable containment seal 400. Receiving opening 52 is a common opening and receives the mixed dose batch into the bounded common volume. A quantity of partitions 53 are in the exit opening of segregating dispensing manifold 50, and effectively divide radial portions of the segregating dispensing manifold 50 into a plurality of equal portion so that the mixed dose batch is divided to meet the positioned open tops 112*a* of the plurality of molds 112*c* and fill the molds. Upon completion support and articulation apparatus 51 actuates and returns segregating dispensing manifold 50 to a receiving position for the next mixed dose batch.

As shown herein, segregating dispensing manifold 50 is formed as a rotating partial cylinder with an angular opening defining the receiving opening 52 and the plurality of partitions 53 at a dispensing opening 54. However, the invention is not limited to this shape but envisions any suitable shape or form effective to receive the mixed dose batch, divide or segregate the batch into equal portions through movement and dispense the equal portions of the mixed dose batch into receiving respective molds 112*c*, without departing from the scope and spirit of the invention herein. While shown as a general cylindraceous shape, any angular polygon, or combined shape effective to achieve the distribution is envisioned herein.

Figure 9A:
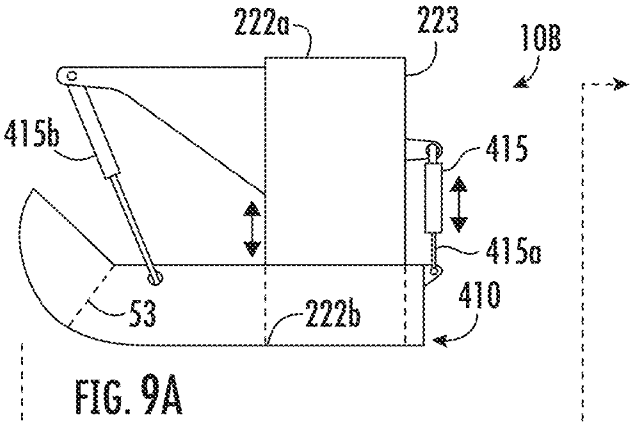
FIGS. 9A, 9B, and 9C are an alternative illustrative flow process embodiment of the present mixing and depositing system and apparatus with dispensement from the mix containment cylinder directly into multiple mold cavities.
Figure 9B:
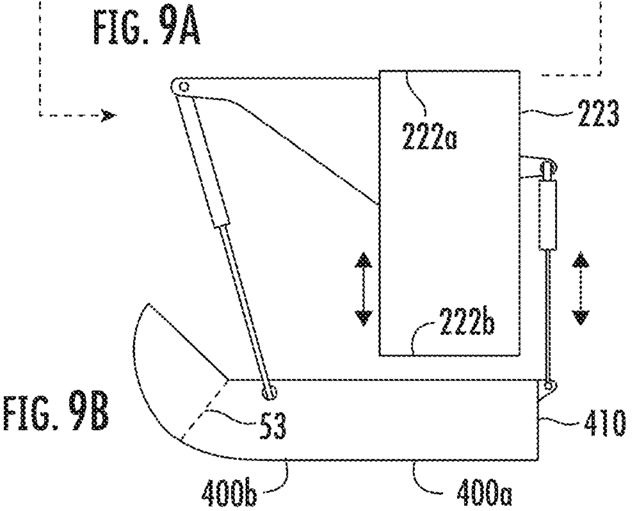
Figure 9C:
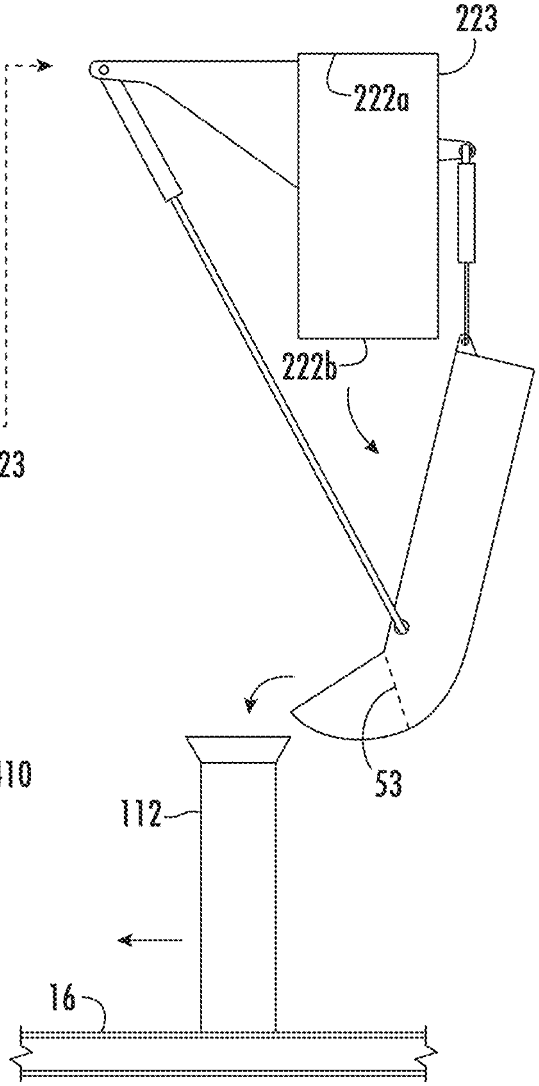

Referring additionally now to FIGS. 9A through 9C, a further alternative adaptive embodiment of the deposition arrangements for the geopolymer foam deposition and mixing system and apparatus 10, 10A are provided herein as 10B. Adaptively, a further adaptive mix containing cylinder 223 with a top opening 222*a* and a bottom opening 222*b*. A seal for the open bottom 222*b* is achieved with a sealing engagement with an operable releasable containment seal 410 as will be discussed herein and below, and which is actuated by a seal mechanism 415 positioned proximate to and operative with respective actuators 415*a*, 415*b* extending from fixed positions on mix containing cylinder 223 so as to release the operable releasable containment seal 410 for disbursement of the mixed batch from mix containing cylinder 223, as will be discussed further below.

In this adaptive embodiment releasable containing seal 410 includes a sealing portion 400*a* directly below open bottom 222*b* and a dispensing portion 400*b* extending away from sealing bottom 222*b* so as to guide the mixed dose batch material outwardly from mix containment cylinder 223 as will be discussed. Within dispensing portion 400*b* are a series of partitions 53 at the exit of the releasable containing seal 410 which are effective to equally divide portions of the mixed dose batch according to the number of molds 112*c* in mold assembly 112.

It will be appreciated by those of skill in this art having studied and comprehended the disclosure herein, that actuators 415*a*, 415*b* lower, to release the mixed dose batch from bottom opening 223*b* and pivot releasable containing seal 410 toward molds 112*c*. It will be further appreciated that releasable containing seal 410 is shaped with containing and guiding side walls (shown) with the series of partitions 53 at the dispensing portion 400*b* to guide the mixed dose batch. Accordingly, upon the pivot of releasable containing seal 410, the mixed dose batch exits open bottom 222*b*, is guided by the seal 410 and upon the tilting of seal 410, the mixed dose batch encounters partitions 53 dividing into equal portions to be dispensed into respective molds 112*c*.

Figure 10:
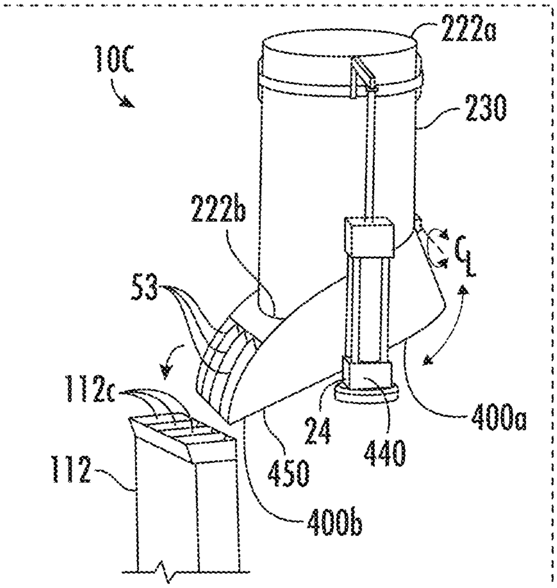
FIG. 10 is a schematic perspective view of a modified system and apparatus of FIGS. 9A, 9B, and 9C with an alternative pivot arrangement.

Additionally referring now to FIG. 10, adaptive embodiment of the deposition arrangements for the geopolymer foam deposition and mixing system and apparatus 10, 10A, 10B above are provided with a further adaptive embodiment 10C, wherein a mix containment cylinder 230 has an open top 222*a* and an open bottom 222*b* as shown and an adaptive releasable containing seal 450 having a sealing portion 400*a* directly below open bottom 222*b* and a dispensing portion 400*b* extending away from sealing bottom 222*b* so as to guide the mixed dose batch material outwardly from mix containment cylinder 230 as will be discussed. Releasable containing seal 450 is in the form of a high walled bin with side walls and an exit opening side, as shown.

A quantity of partitions 53 are in the exit opening of releasable containing seal 450 and effectively divide portions of the mixed dose batch received into a plurality of equal portion so that the mixed dose batch is divided equally to meet the positioned open tops 112*a* of the plurality of molds 112*c* and fill the mold upon release of the releasable containing seal 450 by rotation about a pivot axis (shown) by a seal mechanism 440 positioned proximate to and operative with actuator 24 so as to release the operable releasable containment seal 450 for disbursement of the mixed batch in a controlled an uniform manner.

As noted above, the production molds 12, 112, 112*c* in variable sizes and shapes depending upon batch formulation, expansion, and desired final shape after final curing. Similarly, the partitions 53 as shown herein and above, need not be shaped as dividing walls from a common volume but may be any suitable form or shape adapted to the scope and spirit herein, including but not limited to further channels, funnels, ports or tubes receiving equivalent portions of the mixed dose batch for disbursement. It will be further understood that the common bounded volume as noted in the rotating segregating dispensing manifold 50 may be considered the common bounded volume received in respective releasable containing seals 400, 410, 450 so that the mixed dose batch released from bottom openings 22*b*, 222*b* may be segregated and apportioned by partitions 53 into equivalent amounts for respective molds 12, 112, 112*c* without departing from the scope and spirit of the present invention.

It will be further appreciated by those of skill in the art having fully appreciated the disclosure herein that the respective partitions 53, of any suitable form, may be adapted to divide the mixed dose batch into non-equal but specific amounts, for example, a particular mold may be designated as receiving a multiple of the volume of the mixed does batch of an adjacent mold (for example, twice more or any other multiple) so that the respective partitions 53 may be designed by operators to divide the mixed dose batch for single batch dispensing as needed to meet production requirements according to the respective designated molds.

It will be further appreciated by those of skill in the art herein having studied the disclosure herein that mix containment cylinder 22, 222, 2223, 230 is shown as a cylinder to aid in complete mixing (as discussed) but is not limited to such a geometry, and may instead may be provided in any suitable geometry, or series of geometries, wherein complete mixing of the mixed dose batch is achieved.

For purposes of convenience and clarity only, directional (up/down etc.) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

Also, the inventors intend that only those claims which use the specific and exact phrase "means for" are intended to be interpreted under 35 USC 112. The structure, device, and arrangement herein is noted and well supported in the entire disclosure. Moreover, no limitations from the specification are intended to be read into any claims, unless those limitations are expressly included in the claims.

Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure covers modifications and variations of this disclosure provided they come within the scope of the appended claims and their equivalents.

What is claimed is:

1. A system for producing thermal insulating, architectural, and structural foam, the system having multiple stations in a production loop, said system comprising:

an open top production mold assembly with a plurality of individual molds each having respective open tops and floors;

a vertically oriented mix containment cylinder having an open top and an open bottom, and a bottom edge configured for sealing engagement with a releasable containing seal controlling a dispensement of a mixed batch;

said releasable containing seal having a sealing portion directly sealing said bottom edge and a dispensing guide portion extending away from said sealing portion;

a seal releasing system for articulating said releasable containing seal between a sealed position and an unsealed position to dispense said mixed batch;

a material deposition subsystem including movable hoppers for containing and dispensing bulk materials into said mix containment cylinder;

a motorized mixing apparatus having a rotating head;

a mechanism for lowering and raising said rotating head into and from said mix containment cylinder for operation of said rotating head in said mix containment cylinder and providing said mixed batch;

a segregating dispensing manifold bounding an inner volume and having an entry opening formed to receive said mixed batch from said dispensing guide portion of said releasable containing seal and an exit with a plurality of dividing partitions formed to dispense partitioned mixed batch portions to respective open tops of said plurality of individual molds upon a rotation of said segregating dispensing manifold; and at least one conveyance mechanism for moving one or more of said plurality of individual molds, said mix containment cylinder, said mixing apparatus, said material deposition subsystem, said seal release system, and said segregating dispensing manifold into positions relative to one another for sequential operations.

2. The system, of claim 1, wherein:

said segregating dispensing manifold rotates on a pivot axis from a fill position to a dispensing position.

3. The system, of claim 2, wherein:

said dividing partitions extend within said inner volume perpendicular to said pivot axis of said segregating dispensing manifold; and whereby when said segregating dispensing manifold rotates about said pivot axis said dividing partitions rotate through said mixed batch and partition said mixed batch to said respective individual molds.

4. The system, of claim 2, wherein:

said at least one conveyance mechanism includes a conveyor disposed on a production floor and on which said plurality of individual molds are disposed for moving in relation to said mix containment cylinder, said mixing apparatus, and said segregating dispensing manifold.

5. The system, of claim 4, wherein:

said at least one conveyance mechanism is selected from a heavy duty bulk material handling industrial conveyor, consisting of a roller conveyor, a steel belt conveyor, or a roller chain conveyor.

6. The system, of claim 3, wherein:

said at least one conveyance mechanism is configured to articulate said releasable containing seal and said segregating dispensing manifold about said pivot axis whereby said mixed batch is dispensed from said mix containment cylinder to said respective individual molds.

7. The system, of claim 6, wherein:

said releasable containing seal directly sealing said bottom edge of said mix containing cylinder is formed as an open topped bin with bounding guide walls proximate said sealing portion and an open mouth portion as said dispensing guide portion extending away from said sealing bottom.

8. The system, of claim 6, wherein:

said releasable containing seal directly sealing said bottom edge of said mix containing cylinder is formed as one of a sliding gate slidable relative to said bottom edge and a hinged floor pivotable relative to said bottom edge.

9. A multi-station system for producing millable geopolymer foam blocks comprising:

an open top production mold assembly with a plurality of individual molds each having respective open tops and respective floors;

a vertically oriented mix containment cylinder having an open top and an open bottom, and a bottom edge configured for sealing engagement with a releasable containing seal controlling a dispensement of a mixed batch;

said releasable containing seal having a sealing portion directly sealing said bottom edge and a dispensing guide portion extending away from said sealing portion;

a material deposition subsystem including movable hoppers for containing and dispensing bulk materials into said mix containment cylinder;

a motorized mixing apparatus having a rotating head;

a mechanism for lowering and raising said rotating head into and from said mix containment cylinder for operation of said rotating head in said mix containment cylinder and providing said mixed batch;

a segregating dispensing manifold bounding an inner volume and having an entry opening formed to receive said mixed batch from said dispensing guide portion of said releasable containing seal and an exit with a plurality of dividing partitions formed to dispense partitioned mixed batch portions to respective open tops of said plurality of individual molds upon a rotation of said segregating dispensing manifold; and at least one conveyance mechanism for moving one or more of said plurality of individual molds, said mix containment cylinder, said mixing apparatus, said material deposition subsystem, and said segregating dispensing manifold into positions relative to one another for sequential operations.

10. A system for producing thermal insulating, architectural, and structural foam, the system having multiple stations in a production loop, said system comprising:

an open top production mold assembly with a plurality of individual molds each having respective open tops and respective floors;

a vertically oriented mix containment cylinder having an open top and an open bottom, and a bottom edge configured for sealing engagement with a releasable containing seal controlling a dispensement of a mixed batch;

said releasable containing seal having a sealing portion directly sealing said bottom edge and a dispensing guide portion extending away from said sealing portion;

a seal releasing system for articulating said releasable containing seal between a sealed position and an unsealed position and pivoting said releasable containing seal from said unsealed positioned to a dispensing position about a seal release pivot axis to dispense said mixed batch;

a material deposition subsystem including movable hoppers for containing and dispensing bulk materials into said mix containment cylinder;

a motorized mixing apparatus having a rotating head;

a mechanism for lowering and raising said rotating head into and from said mix containment cylinder for operation of said rotating head in said mix containment cylinder and providing said mixed batch;

a plurality of dividing partitions on said dispensing guide portion of said releasable containing seal that receive said mixed batch from said mix containment cylinder and partition said mixed batch into a respective plurality of partitions for respective said individual molds upon said pivot of said releasable containing seal from said unsealed position; and at least one conveyance mechanism for moving one or more of said plurality of individual molds, said mix containment cylinder, said mixing apparatus, said material deposition subsystem, and said seal release system relative to one another for sequential operations.

11. The system, of claim 10, wherein:

said releasable containing seal is formed as an open topped bin with bounding guide walls proximate said sealing portion and an open mouth portion as said dispensing guide portion extending away from said sealing bottom; and said dividing partitions on said dispensing guide portion extending orthogonal to said seal release pivot axis whereby said mixed batch is segregated by the motion of the mixed batch along said dispensing guide portion toward said open tops of said respective individual molds.

12. The system, of claim 11, wherein:

said at least one conveyance mechanism includes a conveyor disposed on a production floor and on which said plurality of individual molds are disposed for moving in relation to said mix containment cylinder, said mixing apparatus, and said releasable containing seal.

13. The system, of claim 12, wherein:

said at least one conveyance mechanism is selected from a heavy duty bulk material handling industrial conveyor, consisting of a roller conveyor, a steel belt conveyor, or a roller chain conveyor.

* * * * *